H. D. PUFFE.
NON-SLIPPING DEVICE.
APPLICATION FILED OCT. 27, 1913.
1,118,800.
Patented Nov. 24, 1914.
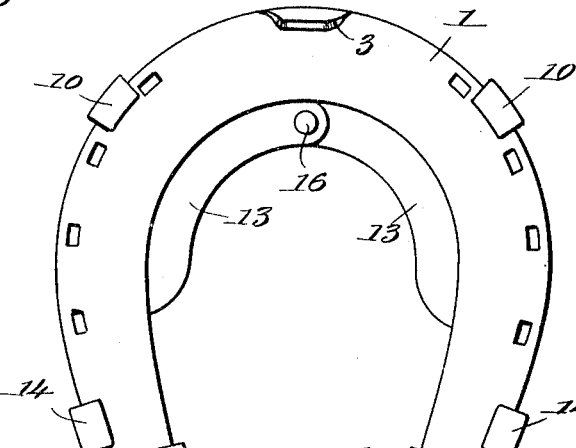
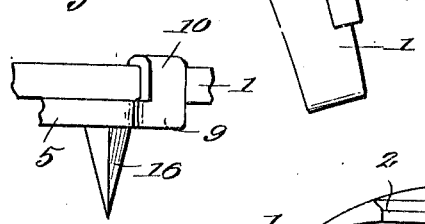
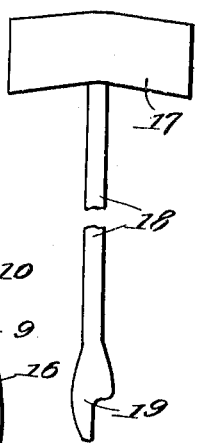
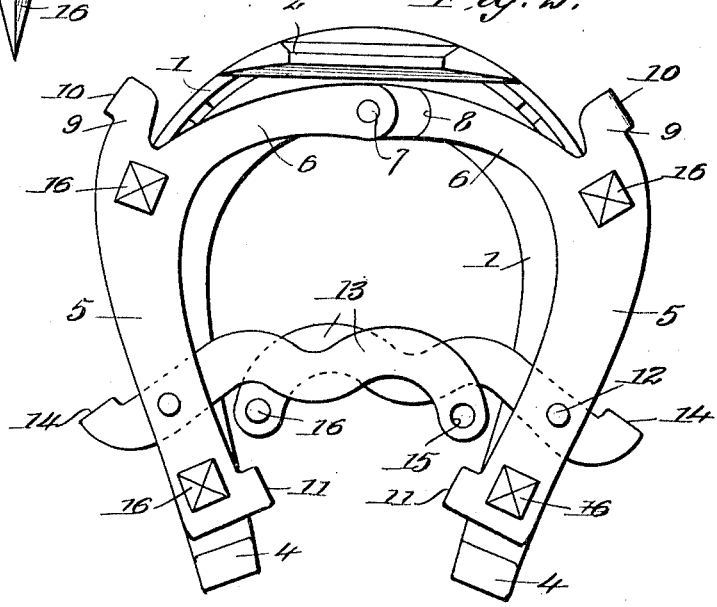

UNITED STATES PATENT OFFICE.

HENRY D. PUFFE, OF SOUTH TACOMA, WASHINGTON.

NON-SLIPPING DEVICE.

1,118,800.

Specification of Letters Patent. Patented Nov. 24, 1914.

Application filed October 27, 1913. Serial No. 797,452.

*To all whom it may concern:*

Be it known that I, HENRY D. PUFFE, a citizen of the United States, residing at South Tacoma, in the county of Pierce and State of Washington, have invented certain new and useful Improvements in Non-Slipping Devices, of which the following is a specification.

This invention relates to an improved non-slipping device, and has for its object to provide a strong, light and durable device for temporary attachment to horse shoes.

A further object of the invention is to provide a device for attachment to horse shoes for the purpose of preventing the animal from slipping on wet or icy pavements; a still further object of the invention being to provide a device of the class which may be readily and quickly applied to and removed from the animal's foot, as well as, novel and peculiar means for adjustably securing the device in place.

A still further object of the invention contemplates the provision of a non-slipping horse shoe attachment wherein the component parts thereof are pivotally connected, and the device in its entirety fastened to and removed from horse shoes of ordinary construction by the manipulation of a pair of pivoted levers so arranged with respect to each other as to coöperate in a manner to be hereinafter fully described to effectually maintain the said attachment incapable of accidental displacement.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings, wherein like characters denote like or corresponding parts throughout the several views, and in which:—

Figure 1 is a top plan view of a horse shoe with a non-slipping device attached thereto; Fig. 2 is an inverted plan view of a horse shoe, the device being illustrated ready for removal; Fig. 3 is a fragmentary side elevation illustrating the detail construction of one of the calks or locking tongues; and Fig. 4 is a side elevation, partly broken away of a tool especially adapted for use to assist in the application of and removal of the attachment from the shoe.

Referring now to the drawings wherein is illustrated the preferred embodiment of my invention the numeral 1 designates an ordinary horse shoe having the usual toe calk 2, toe plate 3 and heel calks 4 associated therewith. It is upon the under face of the horse shoe 1 that the device comprising my invention is adapted to be secured, the said device comprising a pair of clamping sections 5, each section having an inwardly extending arm 6, the said arms being connected as at 7, such connection being in the nature of a sliding pivot, one of the said arms being cut away as at 8 to provide a recess within which the extremity of the opposite arm is disposed to work. The clamping sections 5, when assembled and taken in connection with the arm 6 thereof, effect a non-slipping device of substantially the same configuration as the horse shoe 1, this being illustrated to advantage in Fig. 2 of the drawings.

Extensions 9 are formed integrally with and project outwardly from each clamping section 5 at a point adjacent the connecting point of the arm 6 therewith, the said extensions each terminating in an integrally formed locking tongue 10 the extremity of which is adapted to overlap the horse shoe 1, preferably at a point between the first and second nail holes therein. The extremities of the clamping sections 5 opposite to that upon which the arms 6 are formed, are each provided with a locking tongue 11, the same being formed integrally with and upon the inner edge of the said section 5 to engage and overlap the horse shoe 1 at a point adjacent the heel calks 4 thereof.

Each section 5 is pivoted as at 12, the said section being maintained in spaced relation to the horse shoe by means of a pair of operating levers 13 interposed therebetween, the pivot 12 serving as a connection pivotal in its nature for attaching the said levers 13. Locking tongues 14 are formed, one upon the outer extremity of each of the operating levers 13, the said tongues, during the securing of the device being disposed to overlap the horse shoe 1 upon its outer edge and at a point adjacent the locking tongues 11 above referred to. The said levers 13 are formed substantially in duplicate, one of the said levers however at its inner extremity having an opening 15 formed therein, and the other of the said levers having a lug 16 formed thereupon, the said lug, during the application of the invention adapted to fit the said opening 15 to provide a securing means whereby the two levers 13 are maintained in one position as is illustrated in Fig. 1 of the drawings.

Pointed calks 16 project or depend from the outer or lower face of the attachment, the same being positioned preferably one near each of the extensions 9, and one near each of the locking tongues 11, the former providing a non-slipping means at the toe of the shoe and the latter a non-slipping means at the heel thereof.

While the tool illustrated herein is particularly adapted for use in effecting an attachment and removal of the shoe attachment, any other tool capable of effecting such operation may equally as well be employed. The tool herein disclosed comprises a head 17, handle 18 and extension 19, the latter being formed integrally with the handle 18 upon the opposite end thereof from that to which the head 17 is either formed integrally with or attached.

When it is desired that the non-slipping device should be applied to a horse shoe of ordinary construction, the same is positioned upon the under face of the shoe as is illustrated in Fig. 2 of the drawings, the locking tongues 10, 11 and 14 when thus positioned, all being out of engagement with the horse shoe 1. By forcing the levers 13 forwardly, until the lug 16 is free to fit the opening 15, it is apparent that the locking tongues 14 formed upon the extremities of the said levers will be forced into engagement with the horse shoe 1 and overlap the same at the point aforesaid, at the same time causing the clamping sections 5 to move inwardly and toward each other, this being provided for at the sliding pivot 7, so that the locking tongues 10 and the locking tongues 11 simultaneously engage and overlap the horse shoe 1 with the engagement of the aforementioned locking tongues 14.

A reverse movement of the operating levers 13 above described will automatically withdraw the several locking tongues out of engagement with the horse shoe 1 to permit of ready detachment of the device from the shoe. By forcing the extension 19 of the tool between the levers 13 when the latter have been swung into the position illustrated in Fig. 1, a withdrawal of the lug 16 from the opening 15 may be effected, thereby permitting the said two levers to be swung upon their pivot points 12 for simultaneously withdrawing the several tongues actuated thereby out of engagement with the shoe. The head 17 of the tool may be utilized to assist in the attachment of the device and particularly for forcing the said lug 16 within the opening 15 provided therefor.

From the above, taken in connection with the accompanying drawings, it will be seen that an improved non-slipping device capable of quick detachment and attachment has been provided; that the said attaching and detaching of the device is controlled entirely by the manipulation of the operating levers 13; and that accidental displacement of the device is rendered impossible by reason of the engagement between the several locking tongues and the shoe.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An attachment for horse shoes including a pair of pivotally connected relatively movable clamping sections, an operating lever pivoted to each section, lock means formed upon each lever and each section, said means being movable into and out of engagement with the shoe through actuation of the respective levers, and a lug upon one of the said levers adapted for engagement with an opening in the other of the said levers to lock the two levers immovable and the lock means in engagement with the shoe, as and for the purpose set forth.

2. A non-slipping device for horse shoes including a pair of complementary clamping sections, arms projecting inwardly from and formed integrally with each of the said sections, the inner extremities of the said arms being pivotally connected, extensions formed integrally with each of the said sections, locking tongues formed integrally with each of the said extensions, locking tongues formed integrally with each of the said sections, an operating lever pivotally connected to said sections, a locking tongue formed integrally with and upon one extremity of each of the said levers, and a lug formed upon the opposite extremity of one of the said levers adapted to fit within a recess formed within the extremity of the other of the said levers to fasten the extremities of the said two levers together and to swing the said locking tongue into engagement with the shoe, as and for the purpose set forth.

In testimony whereof I affix my signature in presence of two witnesses.

HENRY D. PUFFE.

Witnesses:
H. A. BURGER,
JOHN C. GILCHRIST.

Copies of this patent may be obtained for five cents each, by addressing the "Commissioner of Patents, Washington, D. C."